(12) United States Patent
Sakamaki et al.

(10) Patent No.: US 8,013,971 B2
(45) Date of Patent: Sep. 6, 2011

(54) DISPLAY MEDIUM

(75) Inventors: Motohiko Sakamaki, Kanagawa (JP); Masaaki Araki, Kanagawa (JP); Takehito Hikichi, Kanagawa (JP); Koichi Haga, Kanagawa (JP); Mamoru Fujita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 233 days.

(21) Appl. No.: 12/547,048

(22) Filed: Aug. 25, 2009

(65) Prior Publication Data
US 2010/0225866 A1 Sep. 9, 2010

(30) Foreign Application Priority Data
Mar. 4, 2009 (JP) .................. 2009-051109

(51) Int. Cl.
*G02F 1/1345* (2006.01)
(52) U.S. Cl. .................................................. 349/149
(58) Field of Classification Search .......... 349/149–150, 349/152
See application file for complete search history.

(56) References Cited

U.S. PATENT DOCUMENTS
6,437,846 B1 * 8/2002 Ono et al. ................ 349/149
2005/0110785 A1 5/2005 Ochiai et al.

FOREIGN PATENT DOCUMENTS
| JP | A-02-077018 | 3/1990 |
| JP | A-07-249488 | 9/1995 |
| JP | A-2004-177475 | 6/2004 |
| JP | A-2005-121965 | 5/2005 |
| JP | A-2008-116635 | 5/2008 |

OTHER PUBLICATIONS
Japanese Office Action issued in Application No. 2009-051109; Dated Mar. 22, 2011 (With Translation).

* cited by examiner

*Primary Examiner* — James Dudek
(74) *Attorney, Agent, or Firm* — Oliff & Berridge, PLC

(57) ABSTRACT

A display medium includes: a pair of substrates that have light transmittance; electrode members that are respectively formed on the opposing surfaces of the substrates, have light transmittance, and are capable of carrying an electric current; a display member that is interposed between the electrode members and displays display information when the electric current is supplied; a terminal portion provided at one electrode member; a reinforcing portion that has electrical conductivity and is joined to the terminal portion; and a mounted electrode that has electrical conductivity and is joined to the terminal portion by a joining material that has, after curing, a cohesive force larger than that of the reinforcing portion. The area of a reinforcing joining region of the terminal portion to which the reinforcing portion is joined is smaller than the area of a mounted joining region of the terminal portion to which the joining material is joined.

16 Claims, 14 Drawing Sheets

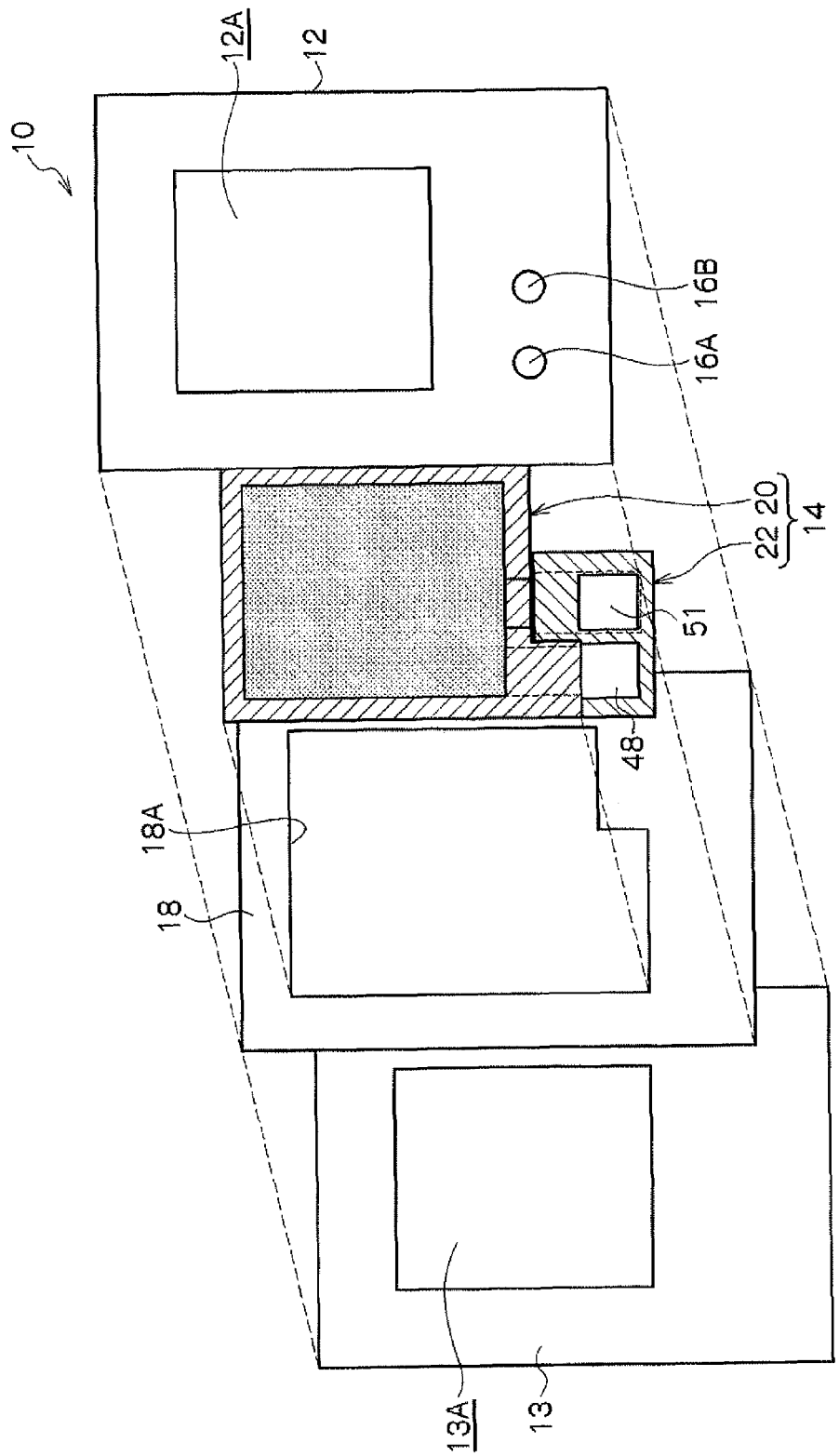

DISPLAY MEDIUM

CROSS-REFERENCE TO RELATED APPLICATION

This application is based on and claims priority under 35 USC 119 from Japanese Patent Application No. 2009-051109 filed on Mar. 4, 2009.

BACKGROUND

1. Technical Field

The present invention relates to a display medium.

2. Related Art

A display medium using a liquid crystal and an organic electroluminescence element and having flexibility has been proposed. Such display medium is formed by using a pair of films formed with transparent electrode patterns of ITO (Indium Tin Oxide) on resin film substrates, directing the surfaces formed with the transparent electrodes inward, and interposing a display member between the opposing transparent electrodes.

SUMMARY

A display medium according to a first aspect of the present invention includes: a pair of substrates that have light transmittance; electrode members that are respectively formed on opposing surfaces of the substrates, have light transmittance, and are capable of carrying an electric current; a display member that is interposed between the electrode members and displays display information when the electric current is supplied; a terminal portion that is provided at at least one electrode member; a reinforcing portion that has electrical conductivity and is joined to the terminal portion; and a mounted electrode that has electrical conductivity and is joined to the terminal portion by a joining material that has, after curing, a cohesive force larger than that of the reinforcing portion, the area of a reinforcing joining region of the terminal portion to which the reinforcing portion is joined being smaller than the area of a mounted joining region of the terminal portion to which the joining material is joined.

BRIEF DESCRIPTION OF THE DRAWINGS

Exemplary embodiments of the present invention will be described in detail based on the following figures, wherein:

FIG. 2 is an exploded view of the display medium according to the first exemplary embodiment of the present invention;

DETAILED DESCRIPTION

A first exemplary embodiment of a display medium of the present invention will be described with reference to the drawings.

Figure 1A:
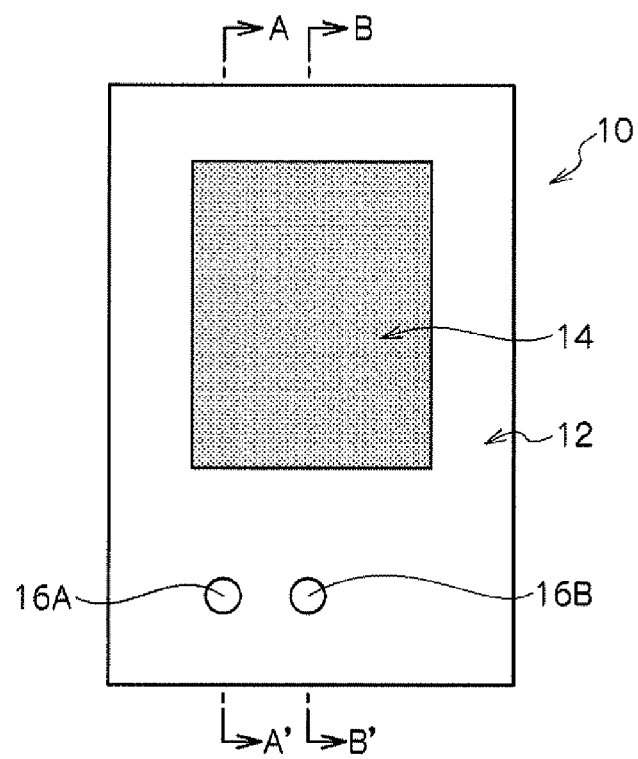
FIGS. 1A and 1B are plan views (of the front and back sides) of a display medium according to a first exemplary embodiment of the present invention.
Figure 1B:
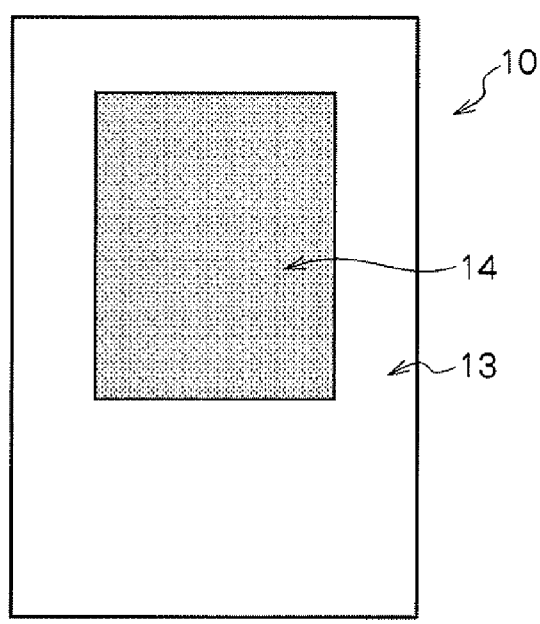

FIGS. 1A and 1B illustrate plan views of the front and back sides of a display medium 10 according to the exemplary embodiment. The display medium 10 has a pair of opposing cover members 12 (front side) and 13 (back side), a display portion 14 interposed between the cover members 12 and 13, and current-carrying terminals 16A and 16B electrically connected to the display portion 14 and exposed from the surface of the cover member 12.

As illustrated in FIG. 2, in the display medium 10, the display portion 14 is fitted into a hole portion 18A formed in a planar core sheet 18, and the display portion 14 and the core sheet 18 are interposed between the cover members 12 and 13. The cover members 12 and 13 have light transmittance and are formed with display window portions 12A and 13A having a size in which the display portion 14 may be visualized.

The display portion 14 has an image display body 20, through which image writing or image displaying is carried out, and a mounted electrode member 22 which is mounted on the image display body 20 and makes the image display body 20 and the current-carrying terminals 16A and 16B conductive.

Details of members configuring the display medium 10 will be described.

Figure 3A:
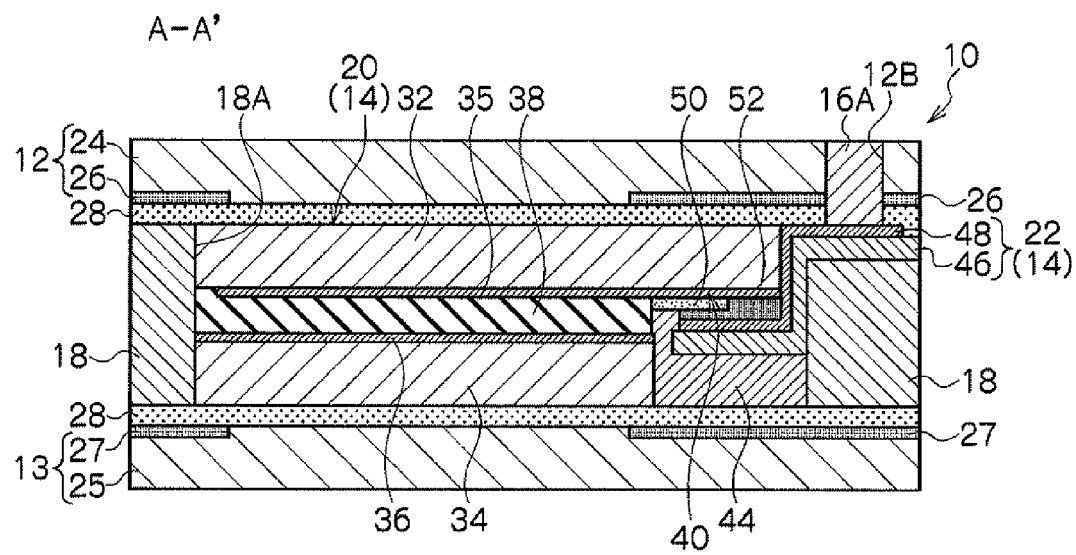
FIGS. 3A and 3B are cross-sectional views of the display medium according to the first exemplary embodiment of the present invention.
Figure 3B:
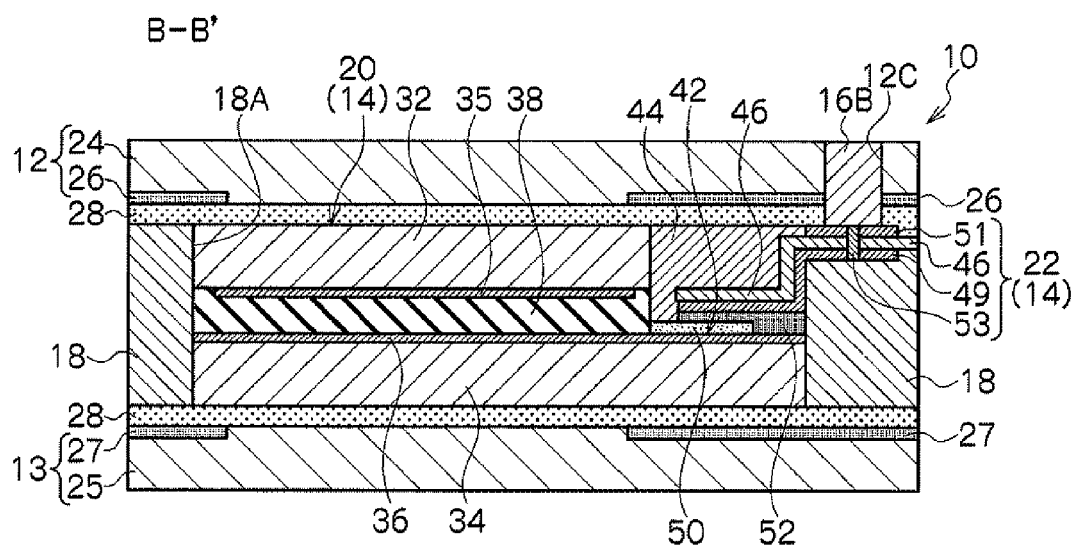

FIGS. 3A and 3B illustrate cross-sectional views of the display medium 10 taken along lines A-A' and B-B' of FIG. 1A. In the display medium 10, adhesive 28 is coated onto the display portion 14, and the upper and lower surface of the core sheet 18 to bond the cover member 12 and 13.

The cover members 12 and 13 have the same configuration, and have film materials 24 and 25 having a thickness of 12 to 150 μm and masking materials 26 and 27 formed by printing on the lower surface of the film material 24 and the upper surface of the film material 25 and covered by the film materials 24 and 25.

As the film materials 24 and 25, a transparent polymer film for light transmission is used. For instance, polypropylene, polyethylene, nylon, polyester, polyvinyl chloride, polyvinylidene chloride, polyvinyl alcohol, ethylene-vinylalcohol polymer, polycarbonate, polystyrene, and cellophane are used. In this exemplary embodiment, polyethylene is used as the film materials 24 and 25.

Each of the masking materials 26 and 27 is an ink printed on the film material 24 or 25 by offset printing, screen printing, or ink jet printing, and has a first ink layer which has a thickness of several to 50 μm and determines the color of the appearance of the display medium 10 and a second ink layer which has a thickness of several to 50 μm and prevents the substrate from being transparent. In this exemplary embodiment, offset printing is used, and the first ink layer and the second ink layer are not illustrated.

The adhesive 28 is a transparent adhesive having light transmittance and a thickness of several to 50 μm. An acrylic or rubber adhesive is used. In this exemplary embodiment, the acrylic adhesive is used.

The image display body 20 has a pair of substrates 32 and 34 having light transmittance, electrode members 35 and 36 which are formed on the opposing surfaces of the substrates 32 and 34, have light transmittance, and are capable of carrying an electric current, a display member 38 which is interposed between the electrode members 35 and 36 and displays an image (display information) when the electric current is carried, and terminal portions 40 and 42 provided at the ends of the electrode members 35 and 36.

The substrates 32 and 34 are resin films having light transmittance, flexibility, and a thickness of 0.01 to 0.5 mm. For instance, a polymer film of polyethylene terephthalate, polysulfone, polyethersulfone, polycarbonate, or polyethylene naphthalate is used. In this exemplary embodiment, polyethylene terephthalate is used as the substrates 32 and 34.

ITO (Indium Tin Oxide) having light transmittance is used for the electrode members 35 and 36. Other than ITO, an electric conductor having light transmittance, such as a metal thin film of Au or the like, a thin film of an oxide such as $SnO_2$ or ZnO, or a thin film of a conductive polymer such as polypyrrole may be used. Each of the electrode members 35 and 36 is formed on the whole of one side of each of the substrates 32 and 34 by sputtering and may be formed by printing, CVD (Chemical Vapor Deposition), and deposition. As the form and driving method of the electrode members 35 and 36, there is used an optical writing driving method in which the electrode members 35 and 36 are made to be the electrodes of the entire surface of the display region to interpose the display member 38 therebetween, and a voltage is switched according to the intensity of a light in the photoconductive layer plane to display a liquid crystal layer.

In the display member 38, a liquid crystal layer, a masking layer, and a photoconductive layer are stacked in that order from the image display side and are bonded by the adhesive having light transmittance. The stacked state of the layers is not illustrated.

As the liquid crystal layer, a PDLC (Polymer Network Liquid Crystal) structure manufactured by dispersing a chiral nematic liquid crystal (cholesteric liquid crystal) into a gelatin binder may be preferably employed. The liquid crystal layer is not limited to this structure and may be realized by a method of arranging the cholesteric liquid crystal in a cell in which the distance between the electrodes is fixed via a rib or liquid crystal encapsulation. The liquid crystal is not limited to the cholesteric liquid crystal. A smectic A liquid crystal, a nematic liquid crystal, and a discotic liquid crystal may be used. The film thickness of the liquid crystal layer is 1 to 50 μm.

As the liquid crystal material, there may be used known liquid crystal compositions, such as cyanobiphenyl, phenylcyclohexyl, phenyl benzoate, cyclohexyl benzoate, azomethine, azobenzene, pyrimidine, dioxane, cyclohexylcyclohexane, stilbene, and tolane. An additive such as a dichromatic pigment or particulates may be added to the liquid crystal material. The liquid crystal material which is dispersed into a polymer matrix, is subjected to polymer gelatinization, or is microencapsulated may be used. Any of a high molecule, a middle molecule, and a low molecule may be used for the liquid crystal, and a mixture thereof may be used.

The masking layer is provided to mask a transmittance light from the non-display side (back side). A material which absorbs at least part of the wavelength of a reading light from an external light source and has a high electric resistance is used. An optical density necessary for the masking layer depends on the sensitivity of the photoconductive layer and the intensity of the reading light, which may not necessarily be defined, and is at least 1 or more, more preferably, 2 or more, in the wavelength range to be masked.

The electric resistance of the masking layer desirably has at least a volume resistivity of $10^8$ Ω·cm or more so as not to lower the resolution by an electric current in the masking layer. To increase the change in a partial pressure applied to the liquid crystal layer, the electrostatic capacitance of the masking layer is preferably larger. Thus, it is preferable that the dielectric constant is larger and the film thickness is thinner. The layer thickness of the masking layer is 0.5 to 3.0 μm.

The material of the masking layer is not limited if it is a black material. A black paint in which an organic pigment such as carbon black or aniline black or a black pigment such as a CuO, MnO, $Cr_2O_3$, Fe—Cr pigment or Cu—Fe—Mn pigment is dispersed into a resin binder such as an acrylic resin, an epoxy resin, a polyester resin, or a polyurethane resin, a resin dyed with a black dye, and a deposition film of a black material such as carbon black may be used.

As the photoconductive layer, there are a layer made of a compound semiconductor such as amorphous silicon, ZnSe, or CdS as an inorganic semiconductor material, a layer made of anthracene and polyvinyl carbazole as an organic semiconductor material, and an OPC layer made of a mixture or a stack of a charge generating material generating an electric charge by light illumination and a charge transport material causing charge movement by an electric field. The thickness of the photoconductive layer is 1 to 100 μm.

The terminal portion 40 is a convex portion protruded from the peripheral edge of the electrode member 35 to the outside and is integrated with the electrode member 35. In the same manner, the terminal portion 42 is a convex portion protruded from the peripheral edge of the electrode member 36 to the outside and is integrated with the electrode member 36. The terminal portions 40 and 42 are offset laterally in a plan view, and thus, do not face each other and are not conductive with each other.

Figure 4A:
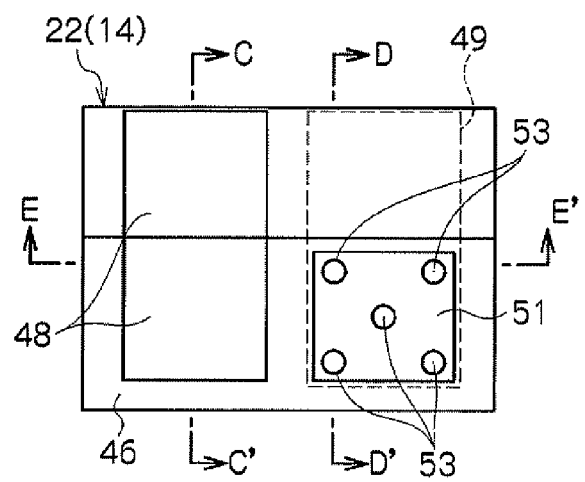
FIGS. 4A and 4B are plan views of a mounted electrode member according to the first exemplary embodiment of the present invention and FIGS. 4C to 4E are cross-sectional views of the mounted electrode member according to the first exemplary embodiment of the present invention illustrated in FIGS. 4A and 4B.
Figure 4B:
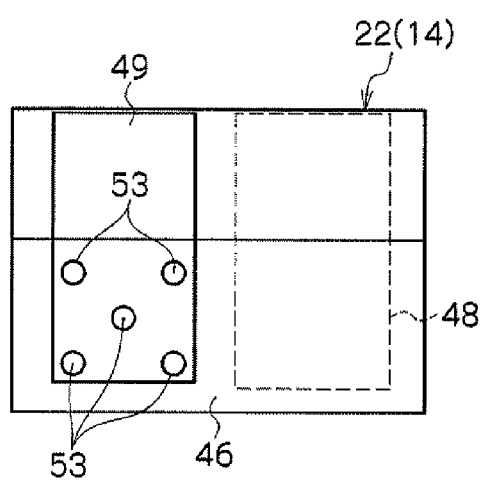
Figure 4C:
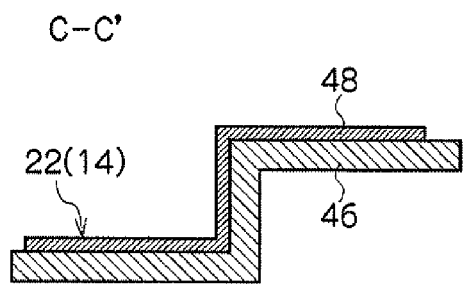
Figure 4D:
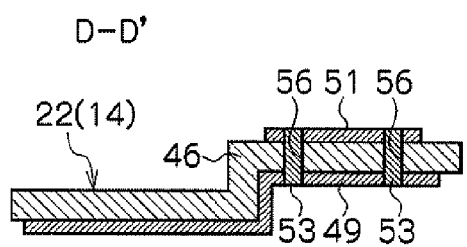
Figure 4E:
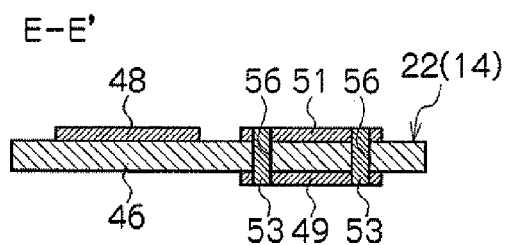

FIGS. 4A and 4B illustrate plan views of the front and back sides of the mounted electrode member 22. FIGS. 4C, 4D, and 4E illustrate cross-sectional views of the mounted electrode member 22 taken along lines C-C', D-D', and E-E' of FIG. 4A. The mounted electrode member 22 is planar before being mounted. Here, the mounted electrode member 22 is illustrated in the mounted state in which the respective portions are folded.

As illustrated in FIGS. 4A to 4E, the mounted electrode member 22 has a flexible substrate 46. Polyimide is used as the flexible substrate 46.

As illustrated in FIGS. 4C and 4E, in the flexible substrate 46, the right half (the structure of the cross section C-C') and the left half (the structure of the cross section D-D') have different configurations in a plan view.

As illustrated in FIG. 4C, on the cross section C-C' of the mounted electrode member 22, a planar electrode 48 is bonded and fixed onto the upper surface of the flexible substrate 46. A metal plate such as a copper plate is used for the electrode 48. A metal plate whose surface is plated with Au or Ni is preferably used.

As illustrated in FIG. 4D, on the cross section D-D' of the mounted electrode member 22, a planar electrode 49 is bonded and fixed onto the lower surface of the flexible substrate 46 and a planar electrode 51 is bonded and fixed at one end of the upper surface of the flexible substrate 46. A metal plate such as a copper plate is used for the electrodes 49 and 51. Preferably, a metal plate whose surface is plated with Au or Ni is preferably used. In the mounted electrode member 22, a throughhole 56 is formed through the electrode 51, the flexible substrate 46, and the electrode 49. The throughhole 56 is filled with an Ag or carbon paste to form a conductive portion 53. The electrodes 51 and 49 on the front and back sides of the flexible substrate 46 are electrically connected by the conductive portion 53.

As illustrated in FIGS. 3A and 3B, acrylic binder Ag conductive paste is coated onto the side close to the display member 38 on the surface of the terminal portions 40 and 42 in order to reinforce (protect) the surface of the terminal portions 40 and 42, and is dried at room temperature for 20 minutes to form a reinforcing portion(s) 50.

A joining portion(s) 52 which respectively joins the electrodes 48 and 49 to the terminal portions 40 and 42 is provided on the surfaces of the electrodes 48 and 49 facing the terminal portions 40 and 42. The joining portion 52 is made of a joining material having conductivity and cohesive force thereof after curing is larger than that of the reinforcing portion 50. In this exemplary embodiment, a thermoplastic conductive paste is used as the joining material. As the thermoplastic conductive paste, a nylon binder Ag paste is used.

The joining portion(s) 52 is formed in such a manner that the thermoplastic conductive paste is coated onto the surfaces of the electrodes 48 and 49 by a screen printing method or a dispenser, is dried at 100° C. for 30 minutes, and is heat pressed at a temperature of 120° C. and a pressure of 5 kg/cm for a pressing time of 30 seconds. The electrodes 48 and 49 and the terminal portions 40 and 42 are electrically connected and mechanically joined. The joining portion(s) 52 has a region directly joined to the electrode members 35 and 36 and a region joined to the reinforcing portion(s) 50 and indirectly joined to the electrode members 35 and 36.

The core sheet 18 is a planar member made of polypropylene, polyethylene, nylon, polyester, polyvinyl chloride, polyvinylidene chloride, polyvinyl alcohol, ethylene-vinylalcohol polymer, polycarbonate, polystyrene, or polyethylene terephthalate copolymer. In this exemplary embodiment, polyethylene is used. The hole portion 18A penetrated according to the outer shape of the display portion 14 is formed in the core sheet 18. An acrylic filling material 44 made of the same material as the adhesive 28 is filled between the mounted electrode member 22 and the adhesive 28.

The current-carrying terminal 16A is attached in such a manner that the terminal member made of a circular copper plate is inserted into a through-hole 12B of the cover member 12 arranged on the upper surface of the electrode 48 and is brought into contact with the upper surface of the electrode 48 so as to be bonded by a two-liquid epoxy binder Ag paste. Five hours is required at room temperature for curing and bonding of the epoxy resin. In the same manner, the current-carrying terminal 16B is attached in such a manner that the terminal member made of a circular copper plate is inserted into a through-hole 12C of the cover member 12 arranged on the upper surface of the electrode 51 and is brought into contact with the upper surface of the electrode 51 so as to be bonded by the two-liquid epoxy binder Ag paste. The electrodes 48 and 51 may be directly used without providing the current-carrying terminals 16A and 16B.

In the display medium 10 having the above structure, an exposure light corresponding to image information illuminates the photoconductive layer from the back side (the cover member 13 side) and a voltage is applied to the current-carrying terminals 16A and 16B, thereby recording an image pattern onto the liquid crystal layer having recording properties. The image pattern is visualized by admitting and reflecting an external light. The display medium 10 of this exemplary embodiment is used as an image recording medium.

A manufacturing method of the display medium 10 will be described with reference to FIGS. 3A and 3B.

Each of the electrode members 35 and 36 is formed on one side of each of the two substrates 32 and 34 by sputtering and an electrode pattern is formed by etching. The liquid crystal layer is formed on the electrode member 35 side, and the photoconductive layer and the masking layer are formed on the electrode member 36 side. These are aligned and bonded to form the image display body 20.

The reinforcing portions 50 are respectively formed in the terminal portions 40 and 42 and the image display body 20 is temporarily driven in order to perform defect check and position check of the display region (aligning of the display window portions 12A and 13A of the cover members 12 and 13) of the display portion 14.

The image display body 20 is temporarily driven by bringing a voltage applying terminal 220 (see FIG. 7A) of a temporal driving inspection machine (not illustrated) applying a voltage to perform temporal driving into contact with the reinforcing portion 50. After the image display body 20 is temporarily driven, the conductive paste is coated onto the electrodes 48 and 49 and the mounted electrode member 22 is joined to the image display body 20 by heat press to form the display portion 14.

The core sheet 18 is formed to insert the display portion 14 into the hole portion 18A of the core sheet 18. The front and back printed cover members 12 and 13 are laminated by the adhesive 28. An outer shape is punched in a predetermined shape to attach the current-carrying terminals 16A and 16B to complete the display medium 10.

A comparative example of the display medium 10 of the first exemplary embodiment of the present invention will be described. Basically, the same parts as the display medium 10 are indicated by the same reference numerals as the display medium 10 and the description is omitted.

Figure 5A:
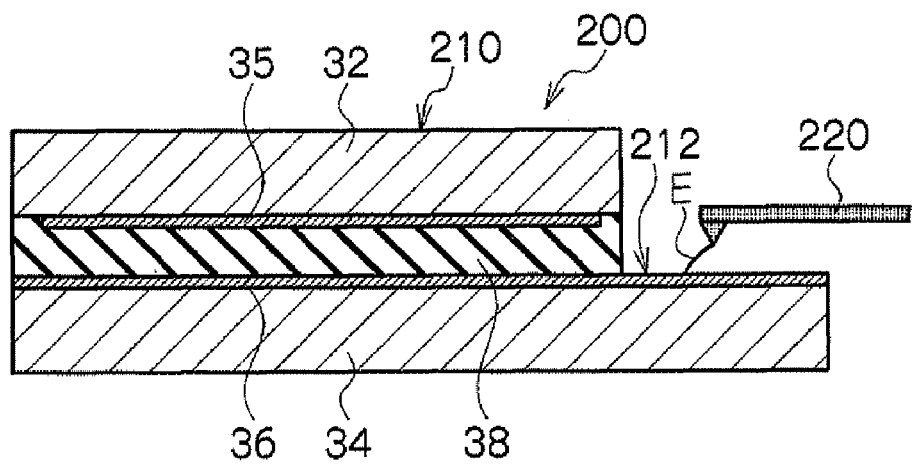
FIGS. 5A and 5B are cross-sectional views illustrating, as a comparative example of the first exemplary embodiment of the present invention, the discharged state with respect to electrode members and the damaged state with respect to the electrode members of a display medium not formed with a reinforcing portion.
Figure 5B:
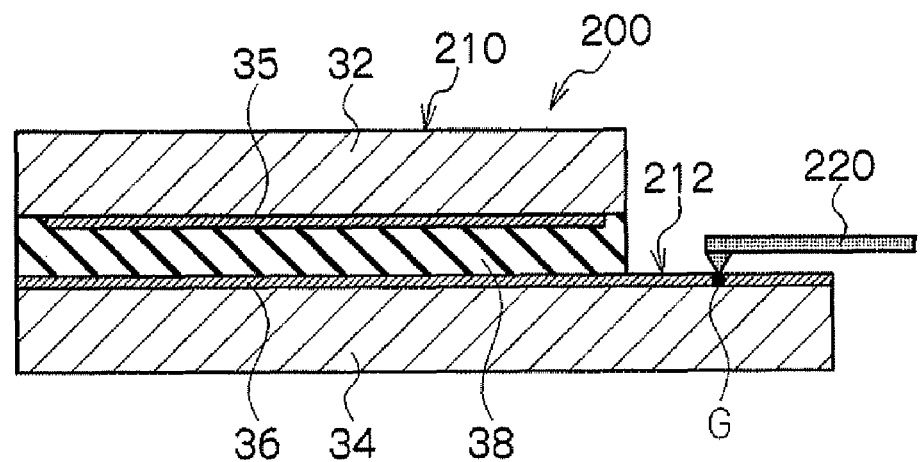

FIGS. 5A and 5B illustrate, as a comparative example of the present invention, the state in which an image display body 210 configuring part of a display medium 200 is temporarily driven by the temporal driving inspection machine without providing the reinforcing portion 50 (see FIGS. 3A and 3B). The image display body 210 has the pair of substrates 32 and 34, the electrode members 35 and 36, the display member 38, and a terminal portion 212. The terminal portion 212 is a convex portion protruded from the peripheral edge of the electrode member 36 to the outside and is integrated with the electrode member 36.

In the image display body 210, in the voltage application of the voltage applying terminal 220 by the temporal driving inspection machine (not illustrated), since the reinforcing portion 50 is absent on the surface of the terminal portion 212, a damage due to discharge E and a dent G due to pressure contact of the voltage applying terminal 220 remain on the surface of the terminal portion 212.

Figure 6A:
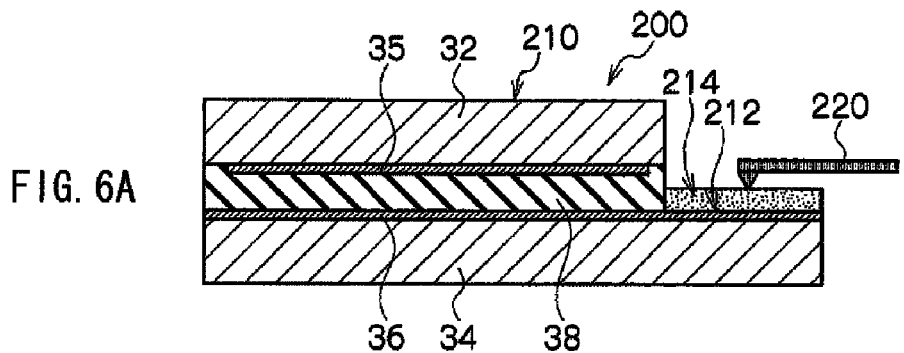
FIGS. 6A to 6D are cross-sectional views illustrating, as a comparative example of the first exemplary embodiment of the present invention, the separated state of the mounted electrode member of the display medium in which a reinforcing portion covers the entire surface of the electrode member.

As illustrated in FIG. 6A, the acrylic binder Ag paste is coated onto the surface of the terminal portion 212 of the image display body 210 and is dried at room temperature for 10 minutes to form a reinforcing portion 214. Since the voltage applying terminal 220 is not directly contacted with the terminal portion 212 when the image display body 210 is temporarily driven, the damage and dent of the terminal portion 212 due to the discharge or pressure contact may be prevented. The reinforcing joining region (a width W2) in which the reinforcing portion 214 covers the terminal portion 212 is the entire mounted joining region (a width W1) in which the mounted electrode member 22 is joined.

Figure 6B:
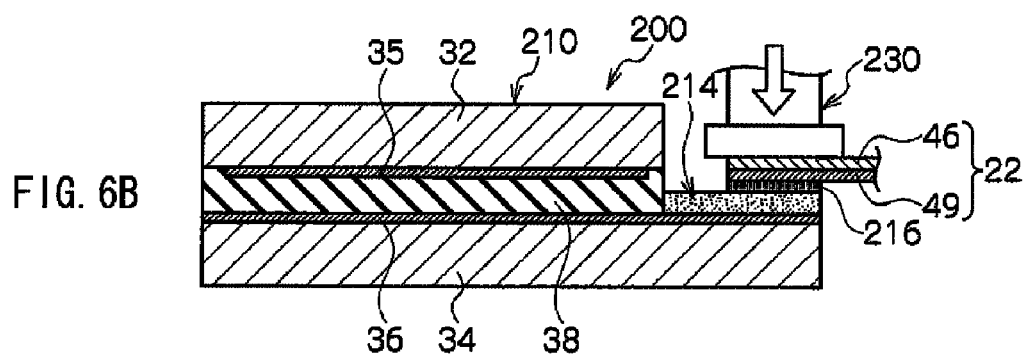
Figure 6C:
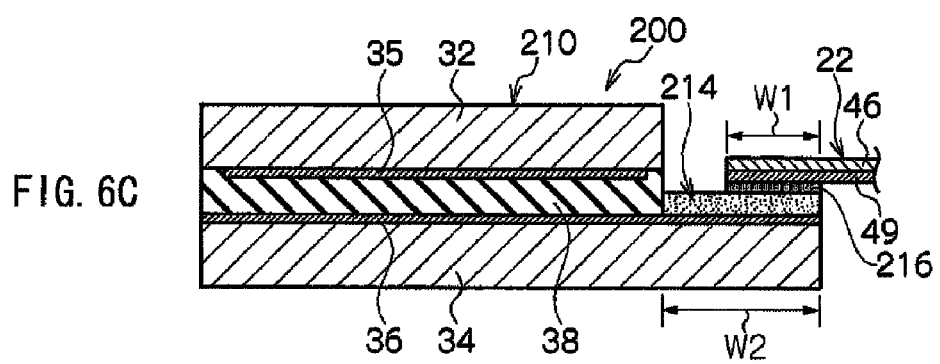

As illustrated in FIG. 6B, the thermoplastic conductive paste (e.g., the nylon binder Ag paste) is coated onto the electrode 49 of the mounted electrode member 22, is dried at 100° C. for 30 minutes, and is heat pressed using a heat press device 230 at a temperature of 120° C. and a pressure of 5 kg/cm$^2$ for a pressing time of 30 seconds. As illustrated in FIG. 6C, a joining portion 216 of the mounted joining region W1 is formed on the surface of the reinforcing joining region W2 of the reinforcing portion 214 of the image display body 210.

Figure 6D:
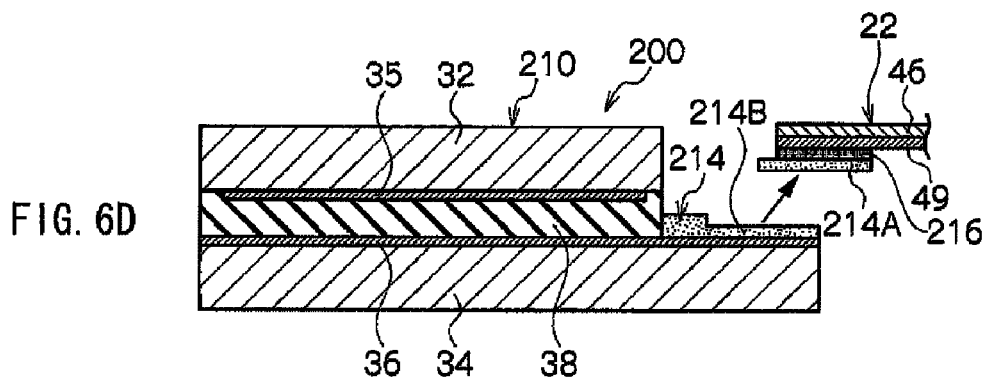

As illustrated in FIG. 6D, when an external force acts in the direction separating the mounted electrode member 22 from the image display body 210 (e.g., when stress when the mounted electrode member 22 is mounted or stress such as bending during use of the display medium 10 after the mounted electrode member 22 is mounted acts), due to the cohesive force after curing of the joining portion 216 being larger than that of the reinforcing portion 214, the reinforcing portion 214 is broken. Breakage of the reinforcing portion 214 will be described with reference to a schematic diagram.

Figure 8A:
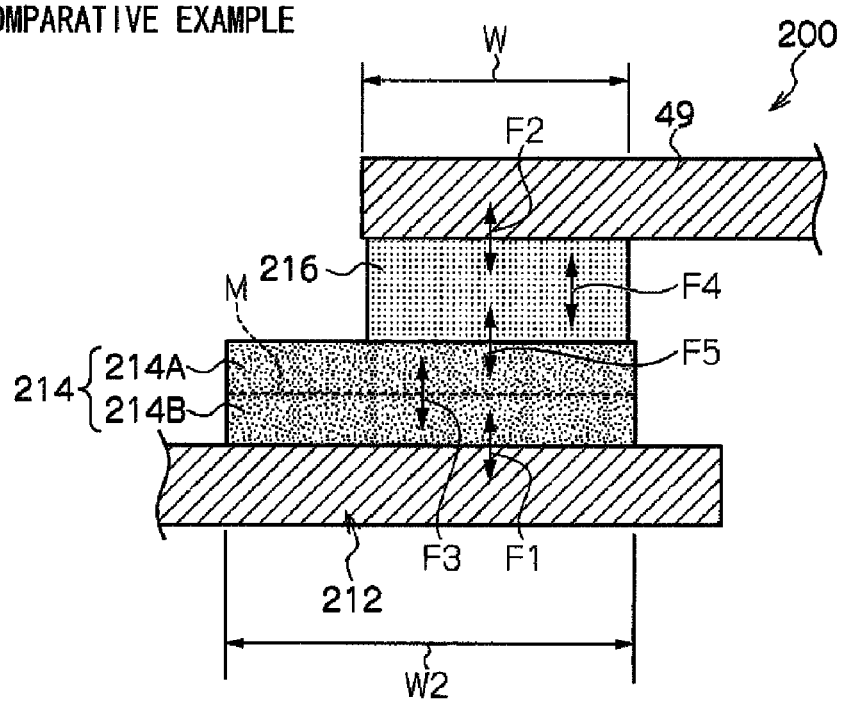
FIG. 8A is an explanatory view schematically illustrating, as a comparative example of the first exemplary embodiment of the present invention, the adhesion forces and the cohesive forces of the members in the state in which the joining portion of the mounted electrode member is joined to the reinforcing portion

FIG. 8A illustrates a schematic diagram of the cross sections of the mounted joining region W1 and the reinforcing joining region W2 of the display medium 200. In FIG. 8A, the adhesion force of the reinforcing portion 214 and the terminal portion 212 is F1, the adhesion force of the electrode 49 and the joining portion 216 is F2, the cohesive force in the reinforcing portion 214 is F3, the cohesive force in the joining portion 216 is F4, and the adhesion force of the reinforcing portion 214 and the joining portion 216 is F5.

To join the terminal portion 212 and the electrode 49, the adhesion forces need to be larger than the cohesive forces. Because the joining portion 216 is formed by heat press, the adhesion force F2 of the electrode 49 and the joining portion 216 is larger than the adhesion force F1 of the terminal portion 212 and the reinforcing portion 214.

The cohesive force F4 of the joining portion 216 is larger than the cohesive force F3 of the reinforcing portion 214. The adhesion force F5 of the reinforcing portion 214 and the joining portion 216 is larger than the cohesive force F3 of the reinforcing portion 214 and the cohesive force F4 of the joining portion 216. Due to this, when the magnitudes of the adhesion forces F1, F2, and F5 and the cohesive forces F3 and F4 in the mounted joining region W1 are compared, the magnitudes are F3<F4<F5<F1<F2.

The cohesive force F3 of the reinforcing portion 214 is the smallest. An external force acts on the electrode 49 (the mounted electrode member 22). The reinforcing portion 214 is first broken on a broken plane M and is divided into a breaking portion 214A adhered to the joining portion 216 and a breaking portion 214B adhered to and remaining on the terminal portion 212.

The operation of the first exemplary embodiment of the present invention will be described.

Figure 7A:
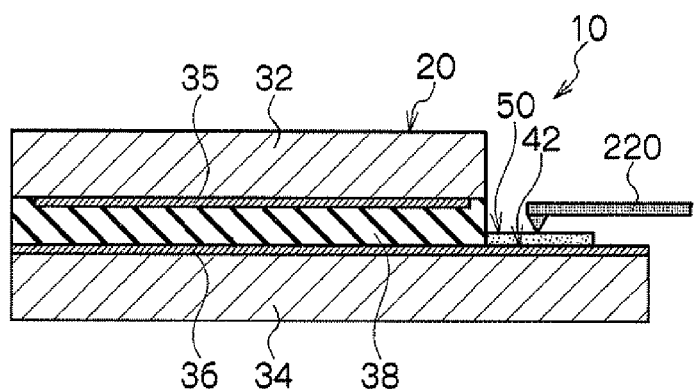
FIG. 7A is a cross-sectional view illustrating the temporarily driven state of a display member according to the first exemplary embodiment of the present invention and FIGS. 7B and 7C are cross-sectional views illustrating the joined state of the mounted electrode member to the display member according to the first exemplary embodiment of the present invention.

As illustrated in FIG. 7A, when the image display body 20 is temporarily driven, the acrylic binder Ag paste is coated onto the surface of the terminal portion 42 of the image display body 20 and is dried at room temperature for 10 minutes to form the reinforcing portion 50 having a reinforcing joining region (a width W3). When the voltage applying terminal 220 is brought into contact with the reinforcing portion 50, the voltage applying terminal 220 is not directly brought into contact with the terminal portion 42. Thus, damage and denting of the terminal portion 42 due to discharge and pressure contact may be prevented. The reinforcing portion 50 is formed at the end of the terminal portion 42 (the end close to the display member 38).

Figure 7B:
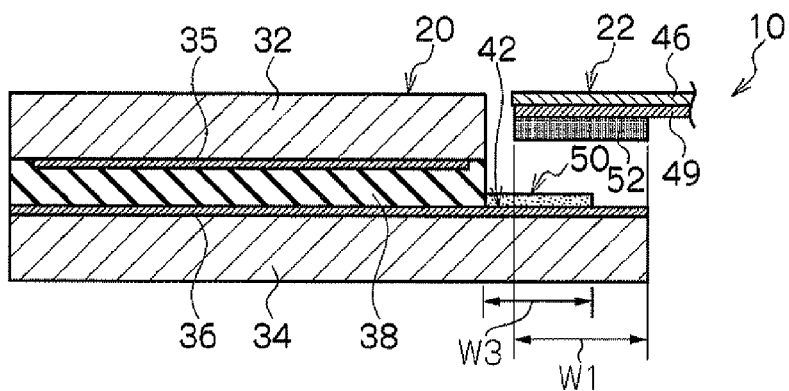
Figure 7C:
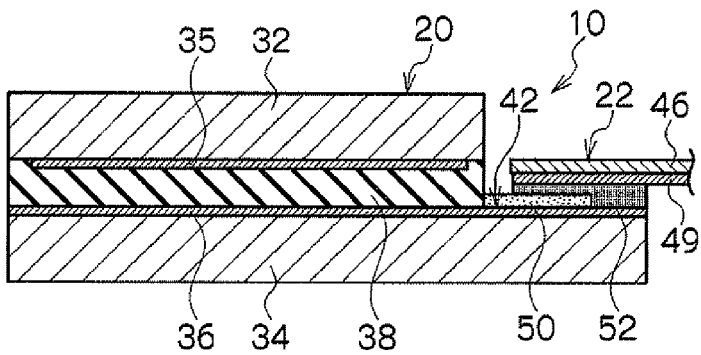

As illustrated in FIGS. 7B and 7C, the thermoplastic conductive paste (e.g., the nylon binder Ag paste) is coated onto the electrode 49 of the mounted electrode member 22, is dried at 100° C. for 30 minutes, and is heat pressed using the heat press device (not illustrated) at a temperature of 120° C. and a pressure of 5 kg/cm$^2$ for a pressing time of 30 seconds. The joining portion 52 of the mounted joining region W1 is formed on the surfaces of the terminal portion 42 and the reinforcing portion 50 of the image display body 20.

Here, when an external force acts in the direction separating the mounted electrode member 22 from the image display body 20 (e.g., when stress when the mounted electrode member 22 is mounted or stress such as bending during use of the display medium 10 after the mounted electrode member 22 is mounted acts), breaking of the reinforcing portion 50 can be prevented. The prevention of the breaking of the reinforcing portion 50 will be described with reference to a schematic diagram.

Figure 8B:
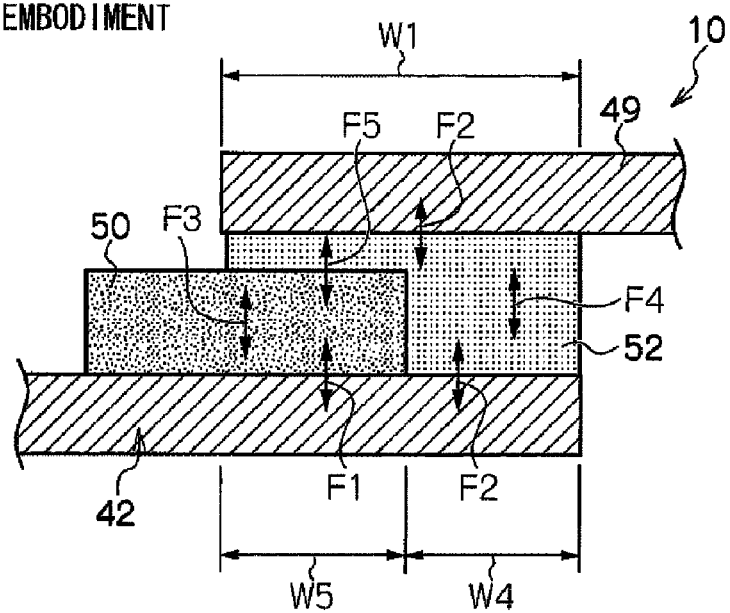
FIG. 8B is a schematic diagram schematically illustrating the adhesion forces and the cohesive forces of the members in the joined state of the mounted electrode member to the display member according to the first exemplary embodiment of the present invention.

FIG. 8B illustrates a schematic diagram of the cross section of the mounted joining region W1 of the display medium 10. The mounted joining region of the joining portion 52 and the terminal portion 42 is W4, and the reinforcing joining region of the reinforcing portion 5 and the terminal portion 42 is W5 (W1=W4+W5). As indicated in FIG. 8B, the area of the reinforcing joining region W5 of the reinforcing portion 50 is smaller than that of the mounted joining region W1. When the mounted joining region W1 is, for example, 10 mm×15 mm, the reinforcing joining region W5 of the reinforcing portion 50 is preferably 10 to 50% of the mounted joining region W1, and more preferably 10 to 25%.

In FIG. 8B, the adhesion force of the reinforcing portion 50 and the terminal portion 42 is F1, the adhesion force of the electrode 49 and the joining portion 52 is F2, the cohesive force in the reinforcing portion 50 is F3, the cohesive force in the joining portion 52 is F4, and the adhesion force of the reinforcing portion 50 and the joining portion 52 is F5. Since the electrode 49 and the terminal portion 42 are made of the same material, the adhesion force of the terminal portion 42 and the joining portion 52 is also F2.

To join the terminal portion 42 and the electrode 49, the adhesion forces need be larger than the cohesive forces. Due to the joining portion 52 being formed by heat press, the adhesion force F2 of the electrode 49 and the joining portion 52 is larger than the adhesion force F1 of the terminal portion 42 and the reinforcing portion 50.

The cohesive force F4 of the joining portion 52 is larger than the cohesive force F3 of the reinforcing portion 50. The adhesion force F5 of the reinforcing portion 50 and the joining portion 52 is larger than the cohesive force F3 of the reinforcing portion 50 and the cohesive force F4 of the joining portion 52. Due to this, when the magnitudes of the adhesion forces F1, F2, and F5 and the cohesive forces F3 and F4 in the mounted joining region W1 are compared, the magnitudes are F3<F4<F5<F1<F2.

When an external force acts in the direction separating the electrode 49 (the mounted electrode member 22) from the terminal portion 42, the cohesive force F3 of the reinforcing portion 50 is the smallest in the reinforcing joining region W5. However, because the external force is resisted by the cohesive force F4 of the joining portion 52 which is larger than the cohesive force F3 in the mounted joining region W4, breakage of the reinforcing portion 50 is prevented, and the joining state of the terminal portion 42 and the electrode 49 is maintained. Here, since description of the terminal portion 40 is the same as for the terminal portion 42 which has been noted and described, description of the terminal portion 40 is omitted.

A second exemplary embodiment of a display medium of the present invention will be described with reference to the drawings. Basically, the same parts as the first exemplary embodiment ate indicated by the same reference numerals as the first exemplary embodiment and the description thereof is omitted.

Figure 9A:
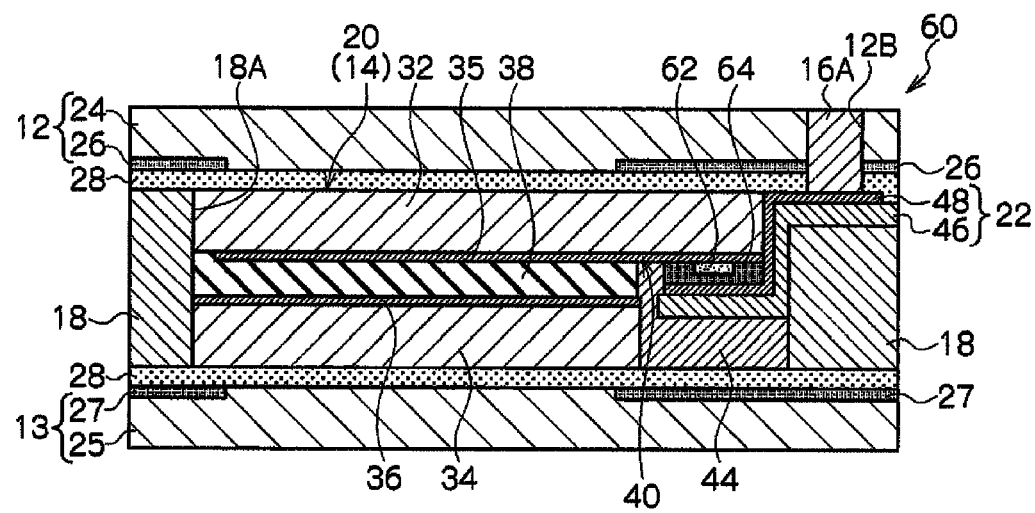
FIGS. 9A and 9B are cross-sectional views of a display medium according to a second exemplary embodiment of the present invention.
Figure 9B:
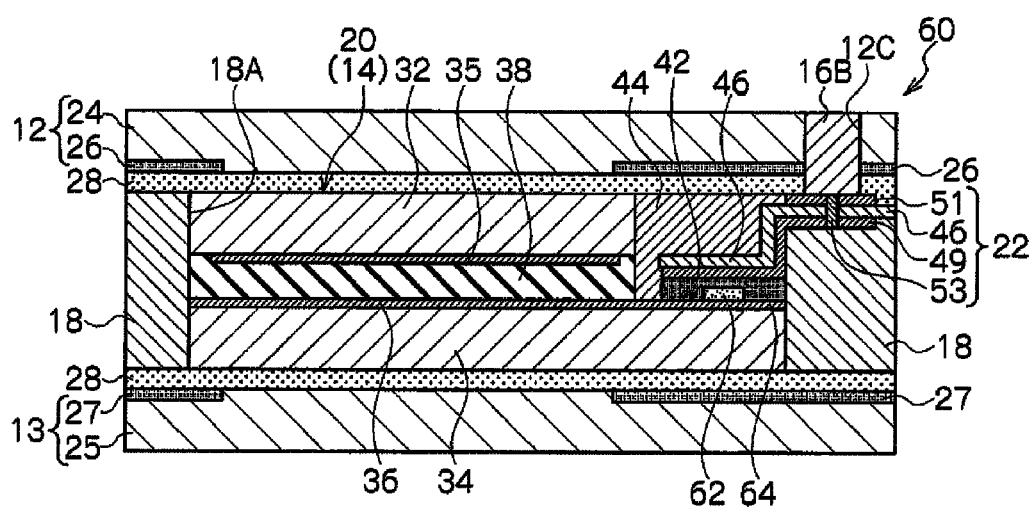

FIGS. 9A and 9B illustrate the cross-sectional views of a display medium 60 of the second exemplary embodiment. The display medium 60 has a reinforcing portion 62 and a joining portion 64 in place of the reinforcing portion 50 and the joining portion 52 of the display medium 10. The reinforcing portion(s) 62 is made of the acrylic binder Ag paste and is formed in the center of the surfaces of the terminal portions 40 and 42. The joining portion(s) 64 is made of the nylon binder Ag paste which has conductivity and cohesive force thereof after curing is larger than that of the reinforcing portion(s) 62 and is formed so as to cover the reinforcing portion(s) 62 of the surfaces of the terminal portions 40 and 42.

The operation of the second exemplary embodiment of the present invention will be described.

Figure 10A:
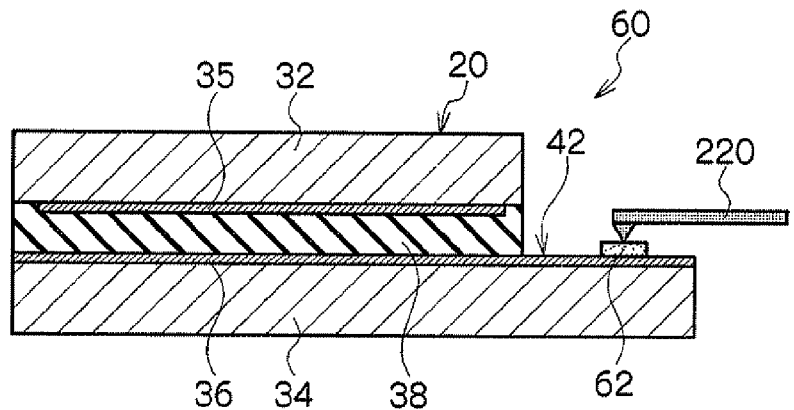
FIG. 10A is a cross-sectional view illustrating the temporarily driven state of the display member according to the second exemplary embodiment of the present invention and FIGS. 10B and 10C are cross-sectional views illustrating the state of joining the mounted electrode member to the display member according to the second exemplary embodiment of the present invention.

As illustrated in FIG. 10A, when the image display body 20 of the display medium 60 is temporarily driven, the acrylic binder Ag paste is coated onto the center of the surface of the terminal portion 42 of the image display body 20 and is dried at room temperature for 10 minutes to form the reinforcing portion 62 having a reinforcing joining region (a width W6). When the voltage applying terminal 220 is brought into contact with the reinforcing portion 62, the voltage applying terminal 220 is not directly brought into contact with the terminal portion 42. Thus, the damage and the dent of the terminal portion 42 due to discharge and pressure contact may be prevented.

Figure 10B:
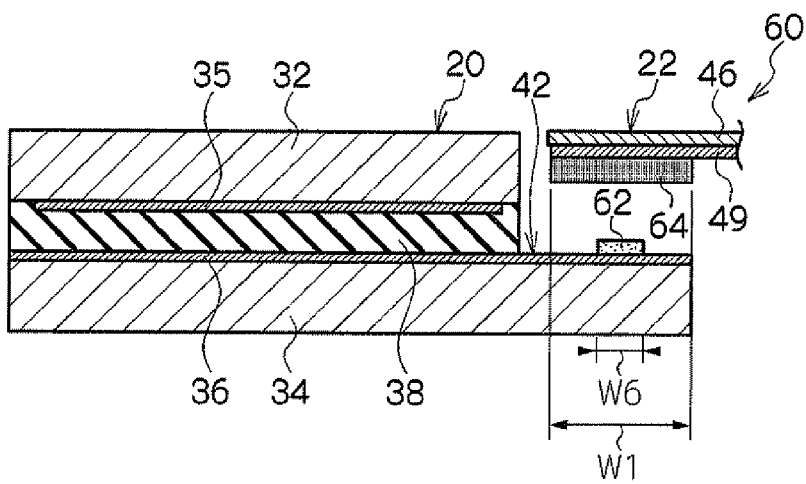
Figure 10C:
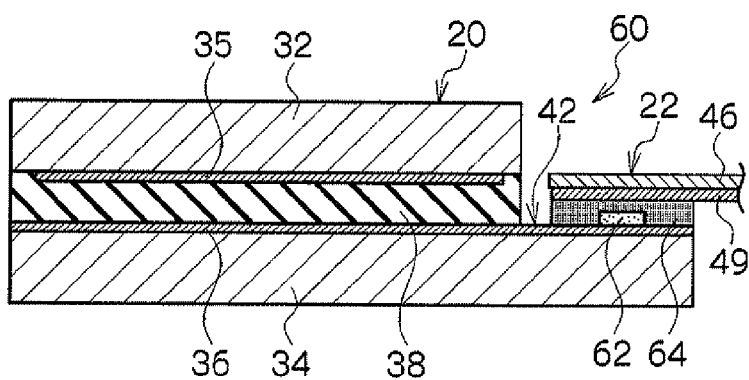

As illustrated in FIGS. 10B and 10C, the nylon binder Ag paste is coated onto the electrode 49 of the mounted electrode member 22, is dried at 100° C. for 30 minutes, and is heat pressed using the heat press device (not illustrated) at a temperature of 120° C. and a pressure of 5 kg/cm$^2$ for a pressing time of 30 seconds The joining portion 64 of the mounted joining region W1 is formed on the surfaces of the terminal portion 42 and the reinforcing portion 62 of the image display body 20. The area of the reinforcing joining region W6 of the reinforcing portion 62 is smaller than that of the mounted joining region W1.

An external force acts in the direction separating the mounted electrode member 22 from the image display body 20 (a stress when the mounted electrode member 22 is mounted or a stress such as bending during use of the mounted display medium 60 after the mounted electrode member 22 is mounted acts). The cohesive force of the reinforcing portion 62 is the smallest in the mounted joining region W1.

Since, the joining portion 64 is provided so as to cover the reinforcing portion 62, the joining portion 64 resists the external force by the cohesive force larger than that of the reinforcing portion 62 in the mounted joining region W1. Due to this, breakage of the reinforcing portion 62 is prevented, and the joining state of the terminal portion 42 and the electrode 49 can be maintained. Here, since description of the terminal portion 40 is the same as for the terminal portion 42 which has been noted and described, description of the terminal portion 40 is omitted.

A third exemplary embodiment of a display medium of the present invention will be described with reference to the drawings. Basically, the same parts as the first exemplary embodiment are indicated by the same reference numerals as the first exemplary embodiment and the description is omitted.

Figure 11A:
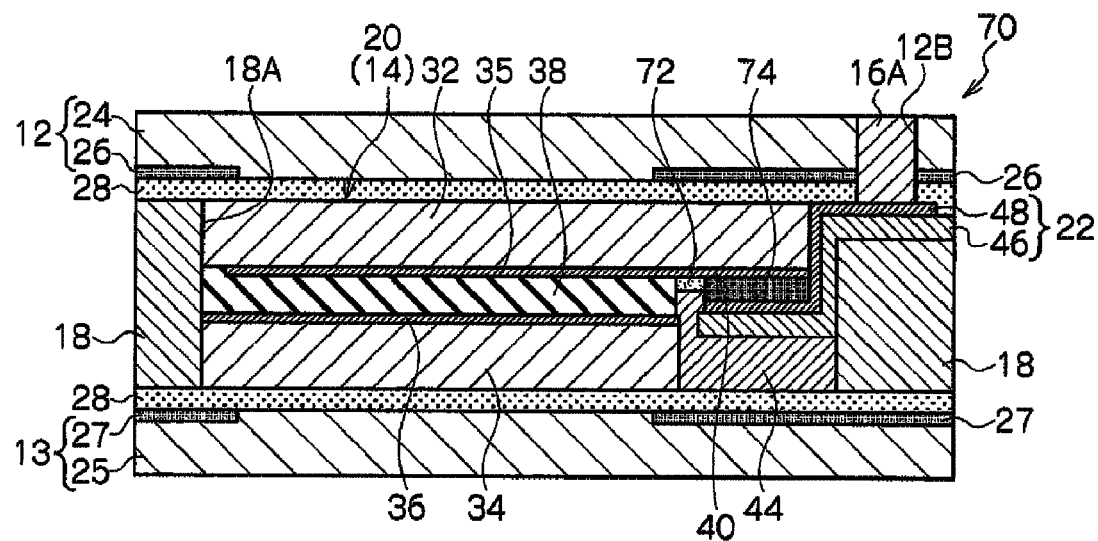
FIGS. 11A and 11B are cross-sectional views of a display medium according to a third exemplary embodiment of the present invention.
Figure 11B:
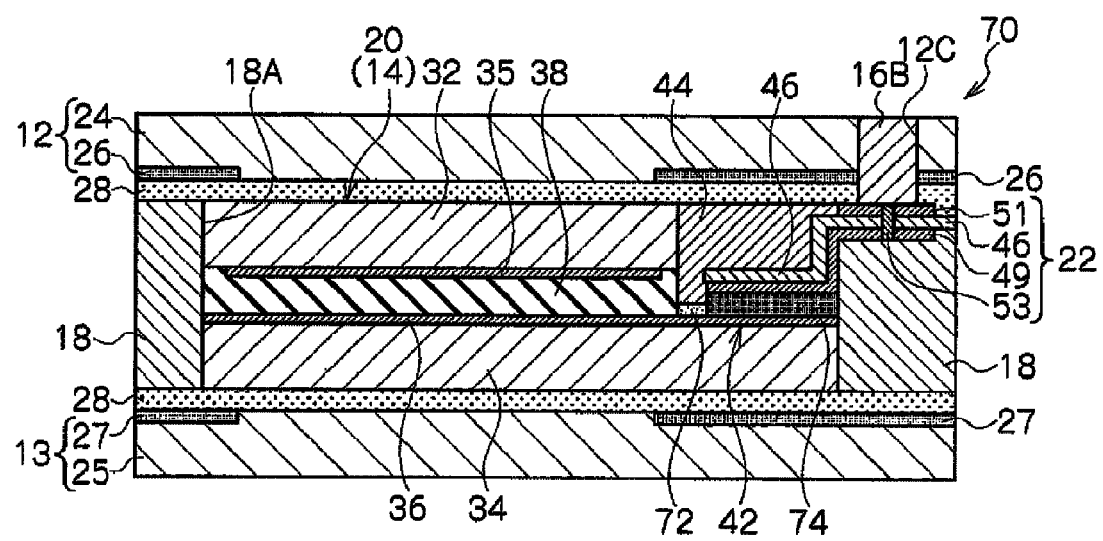

FIGS. 11A and 11B illustrate the cross-sectional views of a display medium 70 of the third exemplary embodiment. The display medium 70 has a reinforcing portion 72 and a joining portion 74 in place of the reinforcing portion 50 and the joining portion 52 of the display medium 10.

The reinforcing portion(s) 72 is made of the Ag paste and is formed at the ends of the surfaces of the terminal portions 40 and 42 (toward the display member 38). The joining portion(s) 74 is made of the nylon binder Ag paste which has conductivity and cohesive force after curing is larger than that of the reinforcing portion 62 and is formed adjacent to the reinforcing portion(s) 72 on the surface of the terminal portions 40 and 42. In this exemplary embodiment, the joining portion 74 is not bonded onto the reinforcing portion(s) 72. The reinforcing portion(s) 72 does not contribute to the joining of the terminal portions 40 and 42 to the electrodes 48 and 49.

The operation of the third exemplary embodiment of the present invention will be described.

Figure 12A:
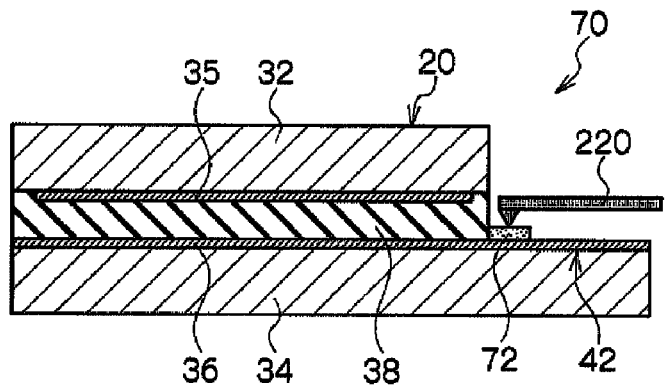
FIG. 12A is a cross-sectional view illustrating the temporarily driven state of the display member according to the third exemplary embodiment of the present invention and FIGS. 12B and 12C are cross-sectional views illustrating the state of joining the mounted electrode member to the display member according to the third exemplary embodiment of the present invention.

As illustrated in FIG. 12A, when the image display body 20 of the display medium 70 is temporarily driven, the acrylic binder Ag paste is coated onto the center of the surface of the terminal portion 42 of the image display body 20 and is dried at room temperature for 10 minutes to form the reinforcing portion 72 having a reinforcing joining region (a width W7). When the voltage applying terminal 220 is brought into contact with the reinforcing portion 72, the voltage applying terminal 220 is not directly brought into contact with the terminal portion 42. Thus, the damage and the dent of the terminal portion 42 due to discharge and pressure contact may be prevented.

Figure 12B:
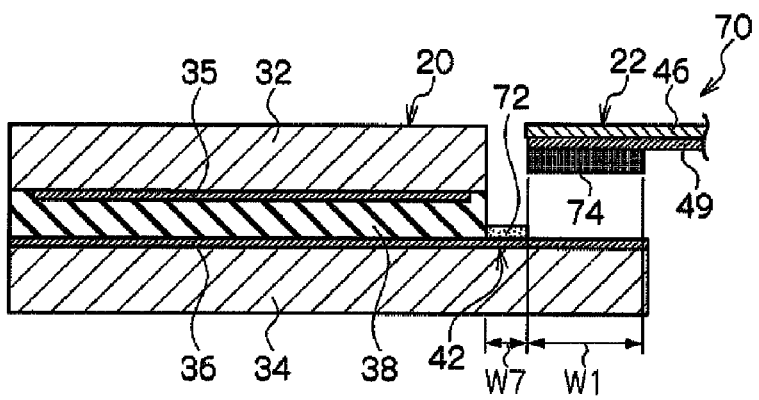
Figure 12C:
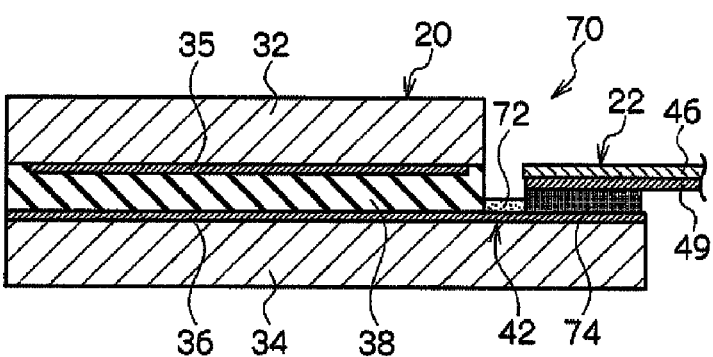

As illustrated in FIGS. 12B and 12C, the nylon binder Ag paste is coated onto the electrode 49 of the mounted electrode member 22, is dried at 100° C. for 30 minutes, and is heat pressed using the heat press device (not illustrated) at a temperature of 120° C. and a pressure of 5 kg/cm$^2$ for a pressing time of 30 seconds. The joining portion 74 of the mounted joining region having the width W1 is formed on the surface of the terminal portion 42 of the image display body 20. The area of the reinforcing joining region W7 of the reinforcing portion 72 is smaller than that of the mounted joining region W1.

When an external force acts in the direction separating the mounted electrode member 22 from the image display body 20, since only the joining portion 74 is provided in the mounted joining region W1, the joining portion 74 resists the external force by the cohesive force which is larger than that of the reinforcing portion 72. Due to this, the joining state of the terminal portion 42 and the electrode 49 is maintained regardless of the reinforcing portion 72. Here, since description of the terminal portion 40 is the same as for the terminal portion 42 which has been noted and described, description of the terminal portion 40 is omitted.

Another exemplary embodiment of a display medium of the present invention will be described with reference to the drawings. Basically, the same parts as the first exemplary embodiment are indicated by the same reference numerals as the first exemplary embodiment and the description thereof is omitted.

Figure 13A:
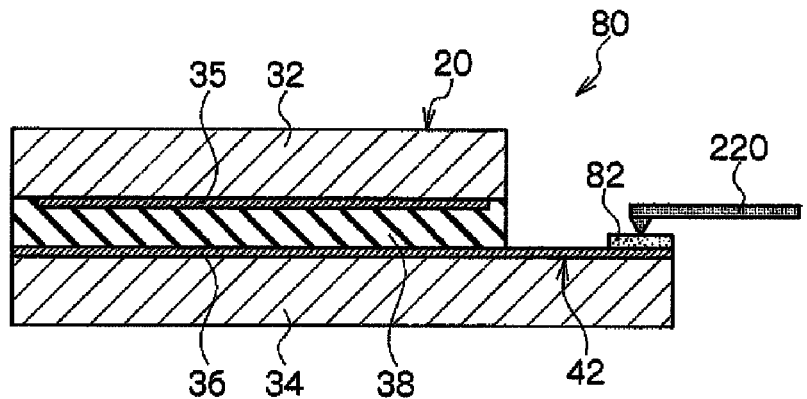
FIG. 13A is a cross-sectional view illustrating the temporarily driven state of a display member according to another exemplary embodiment of the present invention and FIGS. 13B and 13C are cross-sectional views illustrating the state of joining the mounted electrode member to the display member according to another exemplary embodiment of the present invention.
Figure 13B:
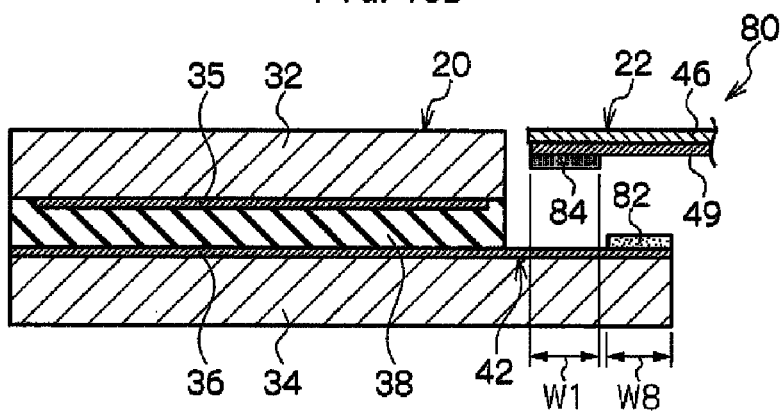
Figure 13C:
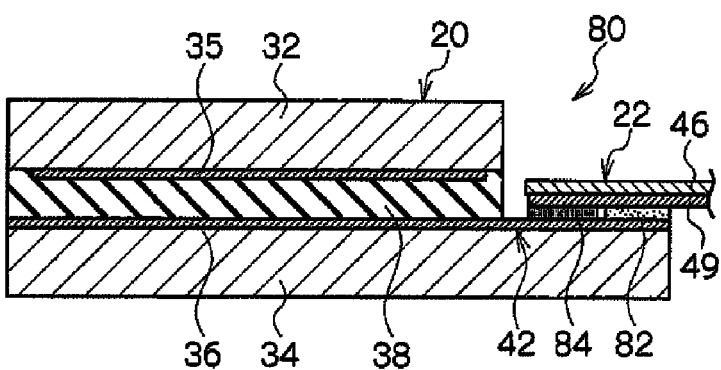

FIG. 13C illustrates the partial sectional view of a display medium 80 of another exemplary embodiment of the display medium of the present invention. The display medium 80 has a reinforcing portion 82 and a joining portion 84 in place of the reinforcing portion 50 and the joining portion 52 of the display medium 10.

The reinforcing portion(s) 82 is made of the acrylic binder Ag paste and is formed at the ends of the surfaces of the terminal portions 40 and 42 (on the opposing side of the display member 38). The joining portion(s) 84 is made of the nylon binder Ag paste which has conductivity and cohesive force after curing is larger than that of the reinforcing portion(s) 82, and is formed adjacent to the reinforcing portion(s) 82 on the surfaces of the terminal portions 40 and 42 so as to be spaced from the reinforcing portion(s) 82.

As illustrated in FIG. 13A, when the image display body 20 of the display medium 80 is temporarily driven, the acrylic binder Ag paste is coated onto the surface at the end (on the opposing side of the display member 38) of the terminal portion 42 of the image display body 20 and is dried at room temperature for 10 minutes to form the reinforcing portion 82 having a reinforcing joining region (a width W8). When the voltage applying terminal 220 is brought into contact with the reinforcing portion 82, the voltage applying terminal 220 is not directly brought into contact with the terminal portion 42. Damage and denting of the terminal portion 42 due to discharge and pressure contact may be prevented.

As illustrated in FIGS. 13B and 13C, the nylon binder Ag paste is coated onto the electrode 49 of the mounted electrode member 22, is dried at 100° C. for 30 minutes, and is heat pressed using the heat press device (not illustrated) at a temperature of 120° C. and a pressure of 5 kg/cm$^2$ for a pressing time of 30 seconds. The joining portion 84 of the mounted joining region W1 is formed on the surface of the terminal portion 42 of the image display body 20. The area of the reinforcing joining region W8 of the reinforcing portion 82 is smaller than that of the mounted joining region W1.

When an external force acts in the direction separating the mounted electrode member 22 from the image display body 20, the external force acts on only the joining portion 84 in the mounted joining region W1. Therefore, the joining portion 84 resists the external force by cohesive force larger than that of the reinforcing portion 82. Due to this, the joining state of the terminal portion 42 and the electrode 49 is maintained regardless of the reinforcing portion 82. The upper surface of the reinforcing portion 82 is brought into contact with the electrode 49 but is not jointed thereto. Thus, the reinforcing portion 82 is not broken. Here, since description of the terminal portion 40 is the same as for the terminal portion 42 which has been noted and described, description of the terminal portion 40 is omitted.

FIGS. 14A to 14K illustrate, as the other exemplary embodiments of the display medium of the present invention, plan sectional views of the arranged states as seen in a plan view of the reinforcing joining region of a reinforcing portion 90 and the joining region of a joining portion 92 in the mounted joining region (square) of the mounted electrode member 22.

Figure 14A:
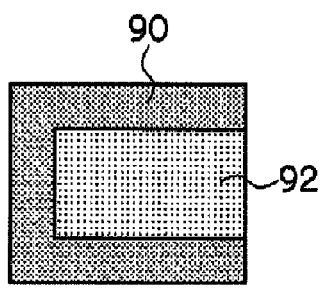
FIGS. 14A to 14K are plan sectional views illustrating the arranged states of a reinforcing portion and a joining portion in the joining region of the mounted electrode member according to another exemplary embodiment of the present invention.
Figure 14B:
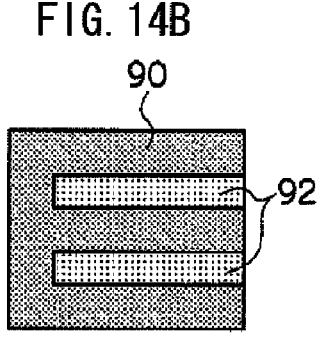
Figure 14C:
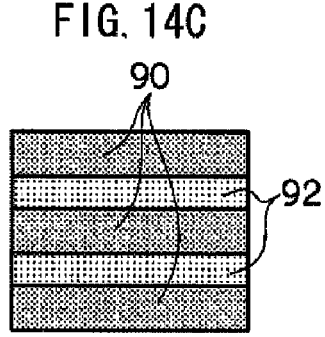
Figure 14D:
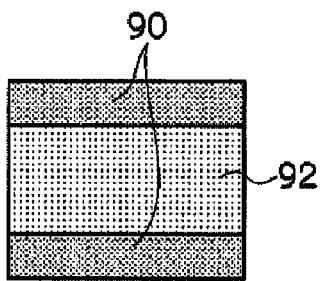

In FIG. 14A, the square joining portion 92 is provided inside the U-shaped reinforcing portion 90. In FIG. 14B, the rectangular joining portions 92 are provided in the gap of the E-shaped reinforcing portion 90. In FIG. 14C, the two belt-shaped joining portions 92 are provided between the three belt-shaped reinforcing portions 90. In FIG. 14D, the one joining portion 92 is provided between the two belt-shaped reinforcing portions 90.

Figure 14E:
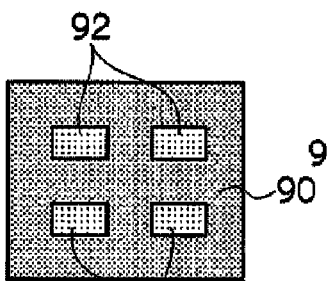
Figure 14F:
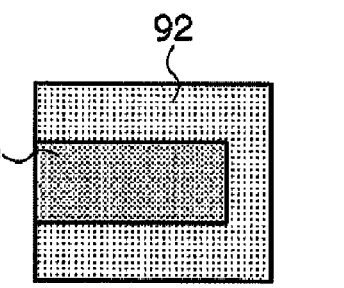
Figure 14G:
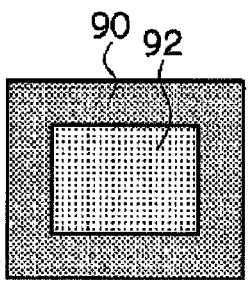
Figure 14H:
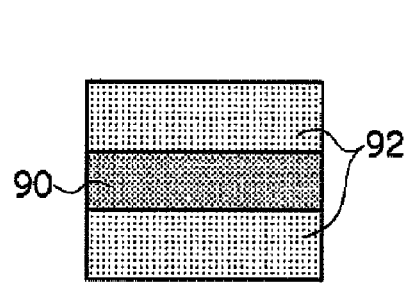
Figure 14I:
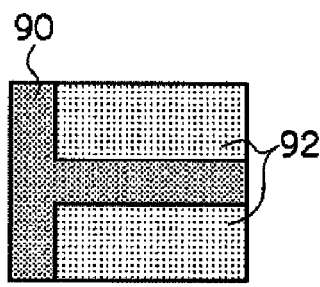

In FIG. 14E, the plural joining portions 92 are provided between the lattice-shaped reinforcing portion 90. In FIG. 14F, the square reinforcing portion 90 is provided inside the U-shaped joining portion 92. In FIG. 14G, the reinforcing portion 90 surrounds the square joining portion 92. In FIG. 14H, one belt-shaped reinforcing portion 90 is provided between two belt-shaped joining portions 92. In FIG. 14I, square joining portions 92 are provided on both side of T-shaped reinforcing portion 90.

Figure 14J:
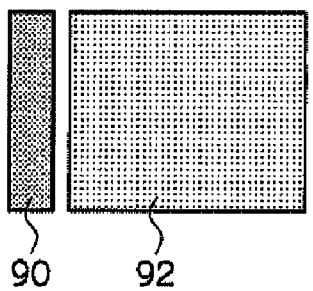
Figure 14K:
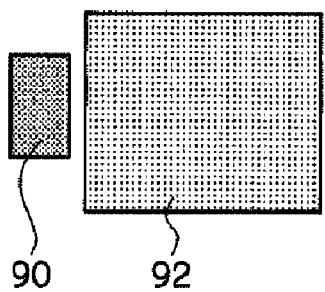

In FIG. 14J, an entire joining region is the joining portion 92. The reinforcing portion 90 having the same width as the joining portion 92 is provided so as to be spaced from the joining portion 92. In FIG. 14K, an entire joining region is the joining portion 92. The reinforcing portion 90 having a width smaller than that of the joining portion 92 is provided so as to be spaced from the joining portion 92.

Various arrangement forms illustrated in FIGS. 14A to 14K of the reinforcing portion 90 and the joining portion 92 in the joining region of the terminal portion and the electrode can be selected.

The present invention is not limited to the above exemplary embodiments.

The display medium 10 has a back-side optical writing form but may have a front-side optical writing form in which the back side is masked. In the mounted electrode member 22, the electrodes 48 and 49 may be separately mounted.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The exemplary embodiments were chosen and described in order to best explain the principles of the present invention and its practical applications, thereby enabling others skilled in the art to understand the present invention for various embodiments and with the various modifications as are suited to the particular use contemplated. It is intended that the scope of the present invention be defined by the following claims and their equivalents.

What is claimed is:

1. A display medium comprising:
   a pair of substrates that have light transmittance;
   electrode members that are respectively formed on opposing surfaces of the substrates, have light transmittance, and are capable of carrying an electric current;
   a display member that is interposed between the electrode members and displays display information when the electric current is supplied;
   a terminal portion that is provided at at least one electrode member;
   a reinforcing portion that has electrical conductivity and is joined to the terminal portion; and
   a mounted electrode that has electrical conductivity and is joined to the terminal portion by a joining material that has, after curing, a cohesive force larger than that of the reinforcing portion, the area of a reinforcing joining region of the terminal portion to which the reinforcing portion is joined being smaller than the area of a mounted joining region of the terminal portion to which the joining material is joined.

2. The display medium of claim 1, wherein the mounted joining region is located at an end of the terminal portion.

3. The display medium of claim 1 wherein the reinforcing joining region is located inside the mounted joining region.

4. The display medium of claim 1, wherein the reinforcing portion is formed so as not to be bonded onto the joining material.

5. The display medium of claim 1, wherein the terminal portion is directly joined to the mounted electrode by the joining material in the mounted joining region, and the terminal portion is joined to the mounted electrode via the reinforcing portion in the reinforcing joining region.

6. The display medium of claim 1, wherein the reinforcing portion is provided so as to be brought into contact with the mounted electrode.

7. A display medium comprising:
   a pair of substrates that have light transmittance;
   electrode members that are respectively formed on opposing surfaces of the substrates, have light transmittance, and are capable of carrying an electric current;
   a display member that is interposed between the electrode members and displays display information when the electric current is supplied;
   a terminal portion that extends from at least one electrode member;
   a reinforcing portion that has electrical conductivity and is joined to the terminal portion; and
   a mounted electrode provided so as to be substantially parallel to and face the terminal portion; and
   a joining portion that has electrical conductivity and is formed with a joining material that has a cohesive force after curing larger than that of the reinforcing portion, the area of a reinforcing joining region of the terminal portion to which the reinforcing portion is joined being smaller than the area of a mounted joining region of the terminal portion to which the joining portion is joined.

8. The display medium of claim 7, wherein the mounted joining region is located at an end of the terminal portion.

9. The display medium of claim 7, wherein the reinforcing joining region is located inside the mounted joining region.

10. The display medium of claim 7, wherein the reinforcing portion is formed so as not to be bonded onto the joining material.

11. The display medium of claim 7, wherein the terminal portion is directly joined to the mounted electrode by the joining material in the mounted joining region, and the terminal portion is joined to the mounted electrode via the reinforcing portion in the reinforcing joining region.

12. The display medium of claim 7, wherein the area of the reinforcing joining region is approximately 10 to 50% of that of the mounted joining region.

13. The display medium of claim 7, wherein the joining portion is formed so as to cover the reinforcing portion.

14. The display medium of claim 7, wherein the reinforcing portion is provided so as to be brought into contact with the mounted electrode.

15. The display medium of claim 7, wherein the reinforcing portion is arranged so as to be spaced apart from the joining portion.

16. The display medium of claim 7, wherein the reinforcing portion is formed in a region of the terminal portion, that does not face the mounted electrode.

* * * * *